United States Patent [19]

Ravin

[11] 3,849,909

[45] Nov. 26, 1974

[54] RESPIRATORY SOUNDS TEACHING APPARATUS

[76] Inventor: Abe Ravin, 45 S. Dahlia St., Denver, Colo. 80222

[22] Filed: Nov. 2, 1973

[21] Appl. No.: 412,214

[52] U.S. Cl. .................................................... 35/17
[51] Int. Cl. .......................................... G09b 23/28
[58] Field of Search ........................................ 35/17

[56] References Cited
UNITED STATES PATENTS

| | | | |
|---|---|---|---|
| 3,564,729 | 2/1971 | Ackerman | 35/17 |
| 3,604,129 | 9/1971 | Eisenberg | 35/17 |
| 3,665,087 | 5/1972 | Poylo | 35/17 |
| 3,769,526 | 10/1973 | Krause | 35/17 X |
| 3,797,129 | 3/1974 | Ravin | 35/17 |

*Primary Examiner*—Harland S. Skogquist
*Attorney, Agent, or Firm*—C. B. Messenger

[57] ABSTRACT

Apparatus for simulating and disseminating characteristic respiratory sounds in separated or combined patterns to facilitate teaching and demonstration operations. Continuous or cyclic sound signals that are related to separate characteristic respiratory sounds are generated mechanically or electronically or recorded from a patient for storage on playback apparatus. The separate characteristic sounds may thereafter be selected for delivery to signal gating means for controlled release singly or in combination to simulate the desired cyclic pattern of respiratory sounds that are to be demonstrated. The output cyclic rate is varied by drive control means regulating the signal gating means, while the proportionate time of each cycle allotted to inspiration and expiration is selectively balanced through further control of the gating drive means. The output signals are delivered together with audio materials as desired to speakers, phone jacks or other broadcast apparatus with separate signals being provided for visual display as on an oscilloscope.

19 Claims, 6 Drawing Figures

RESPIRATORY SOUNDS TEACHING APPARATUS

BACKGROUND OF THE INVENTION

Stethoscope and stethophone types of apparatus have been used for long years in the medical arts to diagnose and analyze the health ills and abnormalities of patients. Over such long period of usage practitioners have developed techniques and background information that could serve to improve the techniques and capabilities of younger and less experienced doctors and nurses if the sounds or inflections of sound that characterize certain diseases and abnormalities could be demonstrated to the learning participant at the same time the condition is being explained. Presently a full demonstration requires the presence of a patient having the particular condition of interest. Such a patient is not at all times available, and, accordingly, the teaching process often fails for lack of an adequate demonstration that could serve to emphasize the knowledge gained. It has previously been shown in the field of cardiology that the combination of oral or written instructional materials and a presentation of actual sounds that audibly demonstrate the condition to be observed materially improves the teaching and learning process. Previously used recordings of actual patient respiratory sounds have improved the learning process, but such recordings have not been fully satisfactory since it is difficult with such recordings to pinpoint the one or two characteristic sounds, lapses of sound or aberations thereof that may identify the condition being observed.

SUMMARY OF THE INVENTION

Devices made in accordance with the present invention will be used in the field of medicine to provide new techniques in connection with the teaching of diagnostic procedures and the analysis of the normal and abnormal patient conditions indicated by respiratory sounds and inflections thereof. The apparatus makes it easier for an experienced practitioner to disseminate background information and observations that might be made in connection therewith as representational sounds are simultaneously heard by the student or interested diagnosticians and observers. Sounds that characterize pulmonary or other body functions that may be regularly heard on stethoscope examination are prerecorded for repetitive dissemination by the separate channels or outlets of a recorder playback type apparatus. Continuous sound signals of individually distinct characteristic are provided for broadcast or release by speakers, stethophones or the like in a patterned arrangement for the simulation of specific patient conditions through use of electric components and signal gating apparatus that has a cyclic release characteristic. Light controlled signal gating means are used together with a rotating control disk to combine the separate sounds if required and to establish and maintain the desired cyclic relation. Sounds that are related to inspiration and expiration functions are separately controlled by segments of the control disk, and the time interval allotted for the dissemination of each such sound can be adjusted through use of speed control apparatus and an interrupted disk drive arrangement. The derived sound related signals and the release thereof may be correlated with additional signals to be similarly released in timed pattern for the visual simulation of additional body functions. An audio presentation of instructional materials related to the type of disease or abnormality to be studied or displayed can be provided together with instructions directing the proper selection of outlets, channels, cyclic rates and relative inspiration and expiration time allotments. By reason of the correlated release of respiratory sounds, audio instructional materials and visual displays, the teaching capabilities and possibilities are substantially enhanced. These same capabilities can be further utilized in connection with patient diagnostic techniques. Actual sounds and signals observed in connection with the examination of a patient may be compared to signals derived and disseminated by the described apparatus.

DESCRIPTION OF THE PREFERRED EMBODIMENTS

Figure 1:
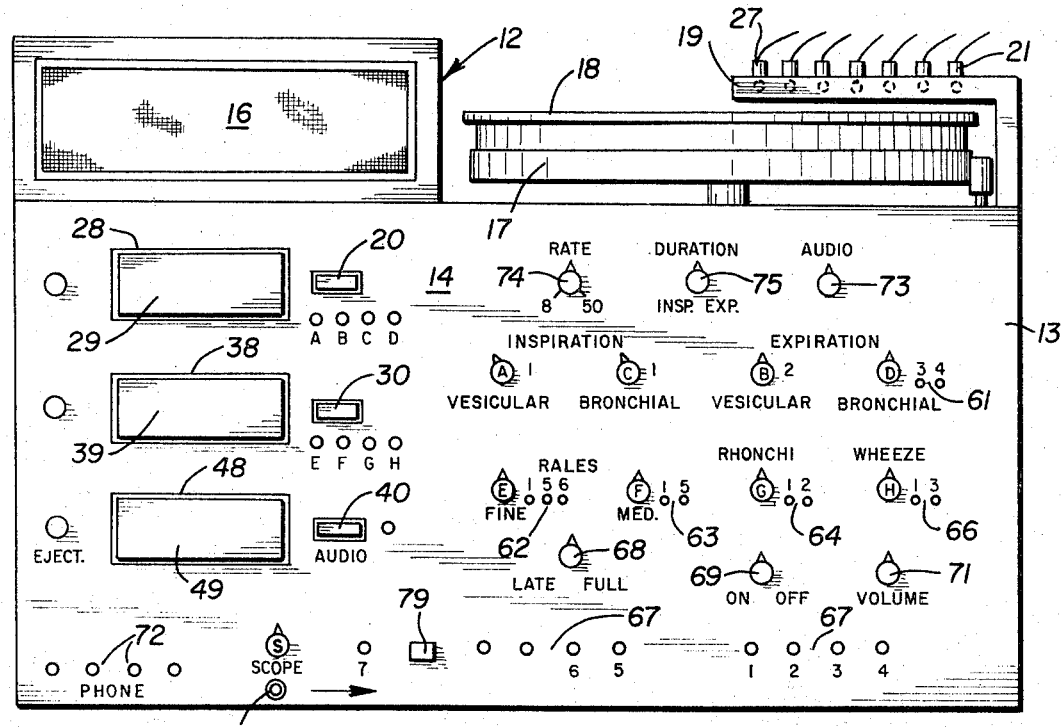
FIG. 1 is a front elevation of a preferred embodiment of the invention.
Figure 5:
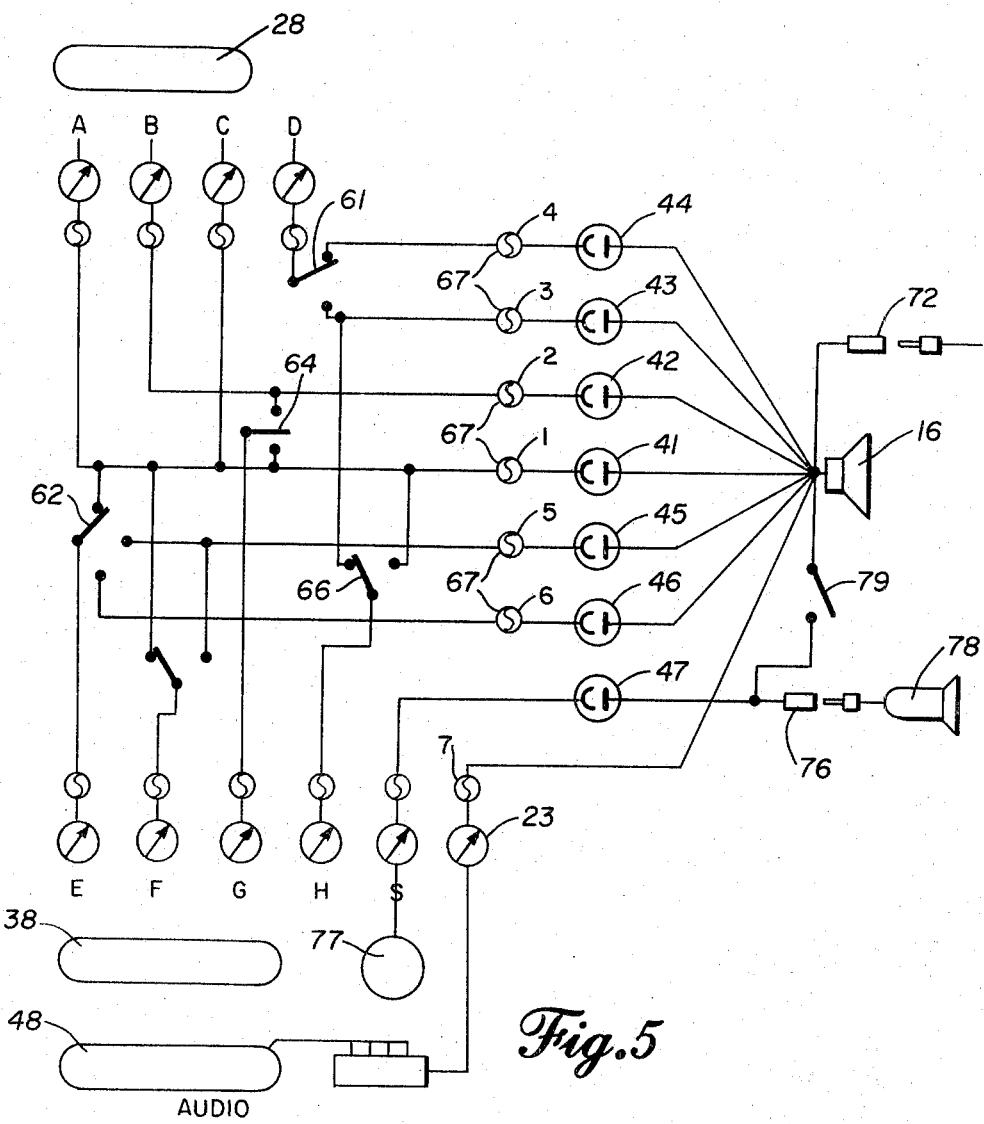
FIG. 5 is a schematic diagram presenting an explanatory circuit for said embodiment.

In FIG. 1 a chest sounds device or unit 12 is illustrated. Such unit in general is embodied within a cabinet 13 which has a front control panel 14. The cabinet provides support for an output speaker 16 and a rotary control table 17 that receives a control disk 18 for rotation beneath and past a bar element 19. The bar 19 supports a plurality of light sources 21–27 at spaced positions to project separate light beams downwardly toward the face of the disk 18, and, accordingly, through the control apertures 31–37 provided by the disk 18. Each of such apertures is identified with a separate output channel 1–7 of the device. For purposes of convenience, related output channels, light sources, photocell resistors, indicator lights and channel selector buttons all have numbers with coordinated unit designations. Basically, the numbers 1–7 applied to the indicator lights 67 depicted in FIGS. 1 and 5 identify the separate circuits.

The combination of the light sources 21–27, the disk apertures 31–37 and the photocell resistors 41–47 provide a gating system for the release of sound related signals carried by the separate circuits of the unit. Photocell 47, light source 27 and aperture 37 are separately related to a signal that may be displayed on an oscilloscope or other display device to provide a visual representation of the period and intensity for inspiration and expiration sounds.

Essentially, FIG. 1 provides an illustration of the control face for an operative unit. In this illustration all the labels applied and all numbering and lettering illustrated are in accordance with the actual labeling on an operative unit. On this control face 14 the numbers 1–7 operate to identify the particular channels that are to be used in demonstration of the various breathing and chest sounds. Numbers having lead lines or underlines relate to the identifying numbers of the present description.

In order to provide an output sound for instructional purposes, it is necessary to have a source for sound related signals that are characteristic of all the separate observed sounds or noises that a doctor might expect to hear when making a stethoscope or stethophonic examination of a patient. The sounds to be demonstrated would include the common sounds of inspiration and expiration as well as most of the abnormal sounds, such as rales, wheezing, etc. Studies of the various sounds that should be demonstrable for teaching and instructional purposes have been made, and it is determined that most all of the normal and abnormal conditions that a doctor might observe in a medical career can be resolved to about eight basic or characteristic sounds. These basic or characteristic sounds, however, are often observed together or in various combinations of changing volume, intensity, duration and periodicity, and the demonstration unit must be capable of demonstrating such changes. In order to provide the separately distinct eight basic sounds, the present device uses a recorded source for such sounds. Tape players having multiple channels are used in the illustrated embodiment. Conventional drive and control elements are provided for a tape player 28, the socket of which receives a tape cartridge 29. Preferably the tape player or players are of a quadrasonic type, and, accordingly, four distinctive sound channels may be provided by each tape player. The similar tape player 38 having a cartridge 39 provides additional channels on which separate and individual characteristic chest sounds are recorded. For the tape player 28 the channels are identified as A, B, C and D, and the separate channels of the player 38 are identified as E, F, G. and H. The legends A–H are applied adjacent the tape players near indicator lights that will show which sound channels are on. Tape drive actuators providing a light indication of usage are also positioned adjacent each tape player. These actuators are identified by the numbers 20 and 30. A third tape player 48 is provided for audio or instructional output. The cartridge 49 for this tape player can be a 4-track or 8-track type. The indicator 40 for this player will have a readout that indicates the particular track then being played.

Separate control knobs that are identified by printed letters at the center of the knob are positioned at the right on face 14. The control knob A is used to turn on and adjust the volume for sounds carried by channel A of the tape player 28. These particular sounds are related to the sound of vesicular breathing on inspiration as set forth by the applied legends. The numeral indication adjacent each of the control knobs A through H indicate the separate circuits 1 through 6 of FIG. 5 to which the particular sound may be applied. Where the particular sound may be used on more than one control circuit, selector buttons and indicator lights are provided so that that sound can be applied to the desired output circuit. As an example, characteristic bronchial sounds on expiration can be directed to circuits 3 or 4. When the control knob D is turned on, one of the selector buttons of switch 61 identified by the number 3 or 4 will also be positioned to select the desired circuit. The control knob D can still be used to adjust the volume of sound to be delivered to the selected circuit. This selection as between the circuits 3 and 4 for the control knob D corresponds in the schematic circuit diagram of FIG. 5 to the illustrated switch 61.

A fine rales sound may be applied to circuits 1, 5 or 6 as indicated when the 3-position switch 62 is moved. Medium rales can be applied to circuits 1 or 5 using switch 63. Rhonchi sounds of channel G may be applied to circuits 1 or 2 through actuation of the switch 64. Wheeze sounds of channel H may be applied to circuits 1 or 3 by use of selector switch 66. Once any particular circuit is selected the indicator lights 67 along the lower line of the control face 14 will be lit to show that that particular circuit is on. Additional control knobs are provided by the unit 12 with the knob 68 being used to adjust the rales presentation for either a late or full condition. The on-off switch 69 turns the entire apparatus on or off, and the volume control knob 71 adjusts the output volume for all sounds that are delivered to the speaker 16 or to the output phone jacks 72. The volume of the audio presentation of tape 49 is controlled by the knob 73. Rate control knob 74 adjusts the output presentation to demonstrate various breathing rates over a range from approximately 5 cycles to say 60 cycles per minute. Marker indications are provided for rates of 8 and 50 cycles per minute.

The duration knob 75 is used to adjust the relative time allotment of each breathing cycle for inspiration and expiration functions. Since patients may inhale slowly and expell rapidly or vice versa depending upon their particular characteristics or particular health problems, it is necessary to provide for adjustments in the proportionate time allotted for demonstration of inspiration and expiration sounds. For the present embodiment of the invention this proportionate adjustment for inspiration and expiration sounds is accomplished through use of variable speed drive components that rotate the control disk 18. Features of a combination apparatus for obtaining this desired result are embodied in FIGS. 3, 4 and 6 to be later described.

Before further explanation of the signal gating apparatus and such variable speed drive, additional features of the output sound components and the derived combinations thereof may be advantageous. The sound presented by channel A of tape player 28 is to be related to the sounds of visicular inspiration. To derive such a characteristic sound an actual patient generated sound will be recorded utilizing stethoscope or stethophone apparatus. One characteristic output sound is selected from separate recordings of several different patients. A short time segment of a recording is selected as the best representation of the desired sound, and thereafter such short time segment presentation is re-recorded in uninterrupted sequence so that the total output on channel A becomes an endless repetition of this one expanded sound segment. The initial sound selected may be of only two-second duration, but the sound output of channel A will be continuous since the tapes for the cartridges 29 and 39 used are of an endless type. This one sound source will be endlessly presented whenever the control knob A is turned on. In a similar manner sounds that are characteristic of other indicated conditions are separately recorded for channels B through H. The sound signal outputs for each of these channels will also be continuously repeated, since the derivation of such sounds can be similar to that described for channel A. These separate characteristic output sound signals will be available for broadcast or other presentation at any time that the separate players 28 and 38 are on. Manipulation of the control knobs A through H provides an initial selection of such sounds, and these controls also provide volume adjustment for the selected sounds.

Since the sounds simulator 12 will have a primary use in connection with the teaching of stethoscopic examinations for chest sounds, it is obvious that all of the continuous sounds from channels A through H cannot be simultaneously released to the speaker 16 or to the phone jacks 72. A signal gating apparatus is used to provide a cyclic presentation of the desired output sound signals initially selected by use of the control knobs A through H and the selector switches 61 through 66. It is the signal gating apparatus itself which operates to combine the selected sound signals for patterned release to the speaker 16 or phone jacks 72. Manipulation of the selector knobs and the switches 61-66 can release the sounds of channels A through H from tape players 28 and 38 to selected output circuits 1 through 6. A control knob S is separately useful to control the output from a visual display signal generator 77 for delivery to the circuit 7. The signal provided by the generator 77 is of a type adapted for visual display when the signal is delivered to an oscilloscope 78 or other visual display device to be plugged into the jack 76 provided by the unit 12. At any time that the scope switch S is on a signal light identified by the numeral 7 will also be on indicating that circuit 7 is activated.

The signals provided by all of circuits 1 through 7 are delivered to photocell resistors 41 through 47 placed in positions of registration with light sources 21 through 27. These elements are also further aligned with the gating control apertures 31 through 37 provided by the gating control disk 18. With this arrangement light transmitted through an aperture 31 to 36 of the control disk activates an associated photoelectric cell, and a sound signal will then be transmitted by the particular circuits 1 through 6 for delivery to the speaker 16 or output phone jacks 72. If light is transmitted through the aperture 37 and received by the photoelectric cell 47, a visual display signal will be transmitted to the output jack 76 and thence to the visual display apparatus used, such as the oscilloscope 78. The combined signals delivered to the speaker 16 or output phone jacks 72 can also be directed to the oscilloscope for visual display of such signal when the switch button 79 is turned on. If a multi-trace scope is utilized, the characteristic patterns of the sound related signals from circuits 1 through 6 can be presented for simultaneous viewing together with the oscilloscope trace of circuit 7.

Figure 2:
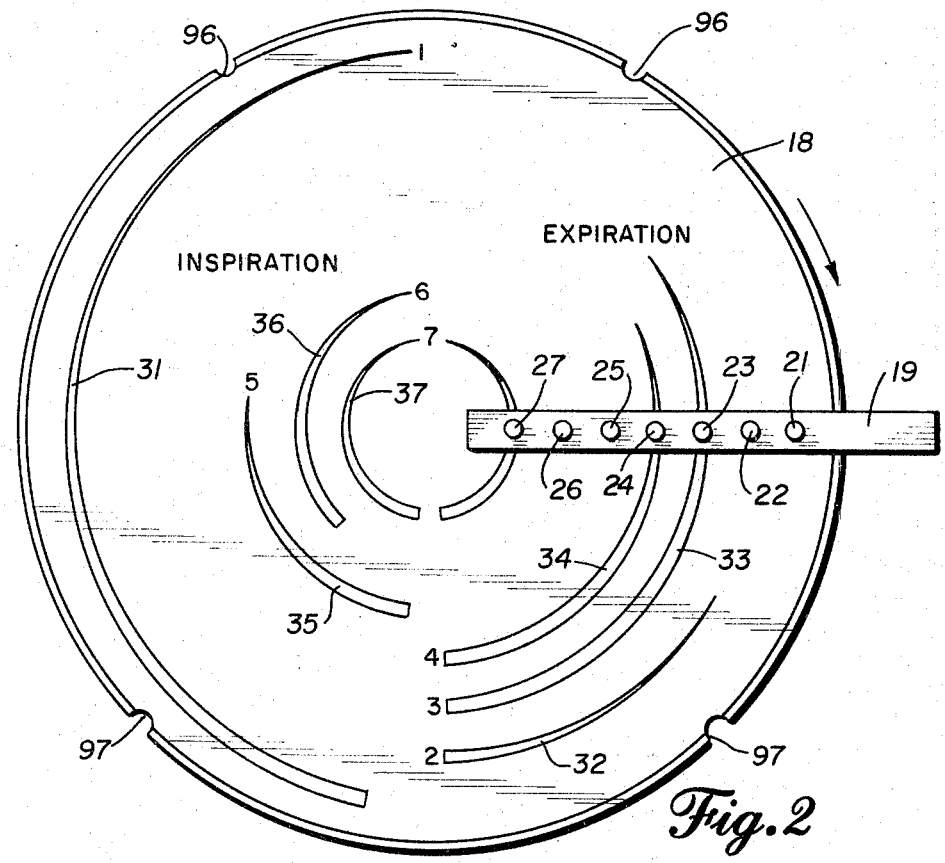
FIG. 2 is a top plan view of a control disk.

Observation of the pattern for the apertures 31-37 on disk 18 as shown in FIG. 2 indicates that as the control disk 18 is rotated past the light sources 21-27, light will be transmitted through the apertures on an interrupted basis. Essentially, the control disk 18 is divided along a major diameter so that control apertures for inspiration, such as the apertures 31, 35 and 36, are on one-half of the disk, while expiration related apertures 32, 33 and 34 are on another half of the disk. Signal gating aperture 37 which activates the visual display signal is near continuous. Since the intensity of the released signals will with this arrangement be regulated by the intensity and duration of light transmitted, each of the gating apertures 31-37 may be provided with contoured shapes or distinctive initiating or terminating contours. Since most of the sounds related to patient breathing have a crescendo or decrescendo pattern, control apertures 31-37 can be provided with a correspondingly tapered shape. With a tapered control aperture, such as the aperture 31, the inspiration related sound output that is controlled by such aperture will be gradually increased from its inception to its termination. With the disk rotating in the direction indicated the inspirational sound will, of course, be followed by an expirational sound, which is generally characterized by a decreasing volume or intensity as the expirational breathing continues. If a disk, such as the control disk 18 illustrated, is placed on a turntable, output sounds that simulate actual patient sounds can be derived. If the turntable 17 is rotated at a regular rate and the slot positions are of equal intervals, the periods for inspiration and expiration will generally be identical. An apparent adjustment between the time interval related to inspiration and the time interval related to expiration can be provided by changes in the time duration length of the gating apertures. Separate disks can also be provided which have different time spaces allotted for inspiration and expiration signals. Accordingly, the combined use of the circuits, control knobs and selectors described with signal gating means having rate and time interval allotment adjustment capabilities can provide output signals that will be simulative of patient related sounds. The use of different or modified control elements, such as the disks 18, can accommodate the apparatus for the demonstration of most all normal and abnormal patient conditions.

Figure 6:
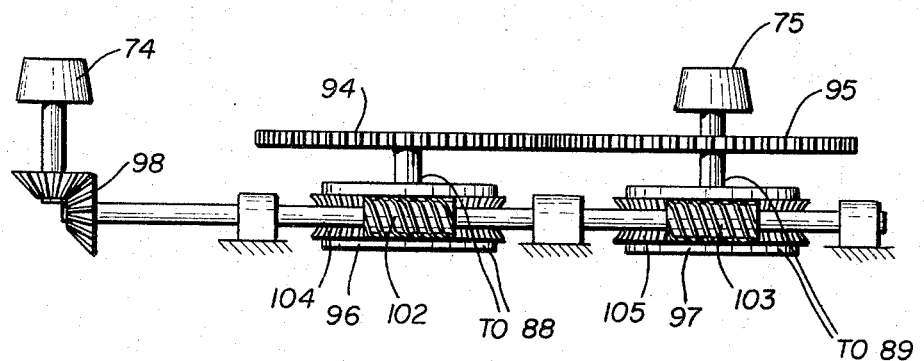
FIG. 6 is a bottom view of rate and duration control apparatus.

Refinements in the present embodiment of the invention are directed to further modification of the signal outputs so the sounds to be observed by the listener can be more closely related to natural or abnormal patient conditions. The drive mechanisms shown in FIGS. 3, 4 and 6 are designed to provide different proportionate time periods for the inspiration and expiration portions of the breathing cycle.

Figure 3:
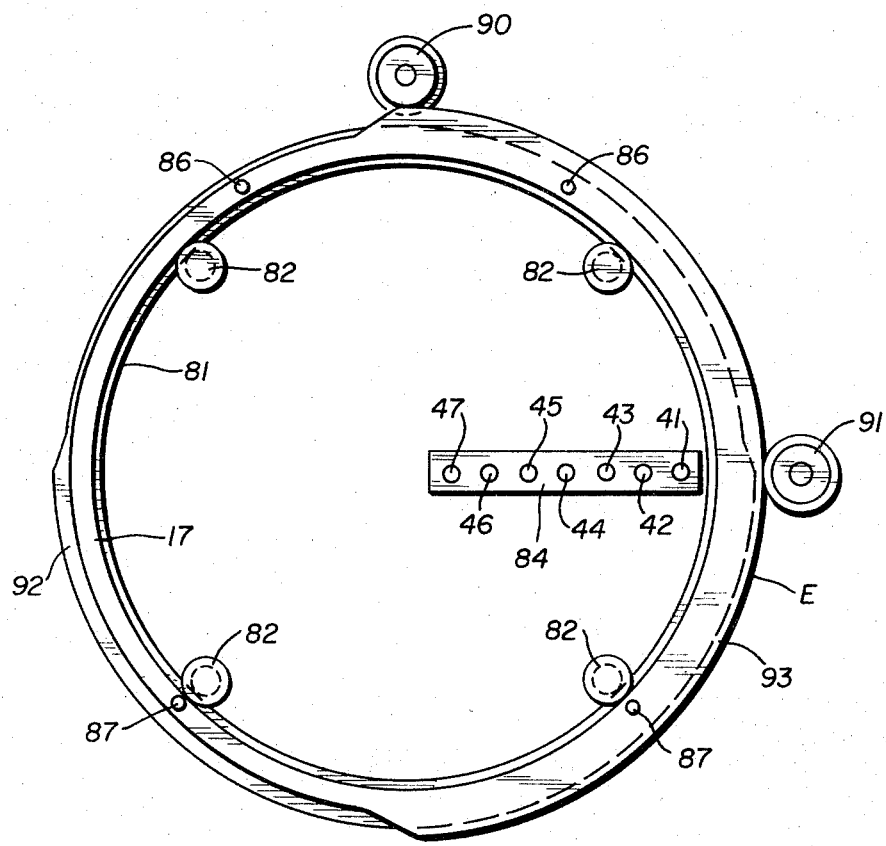
FIG. 3 is a top plan view of the mounting and drive apparatus for said disk.
Figure 4:
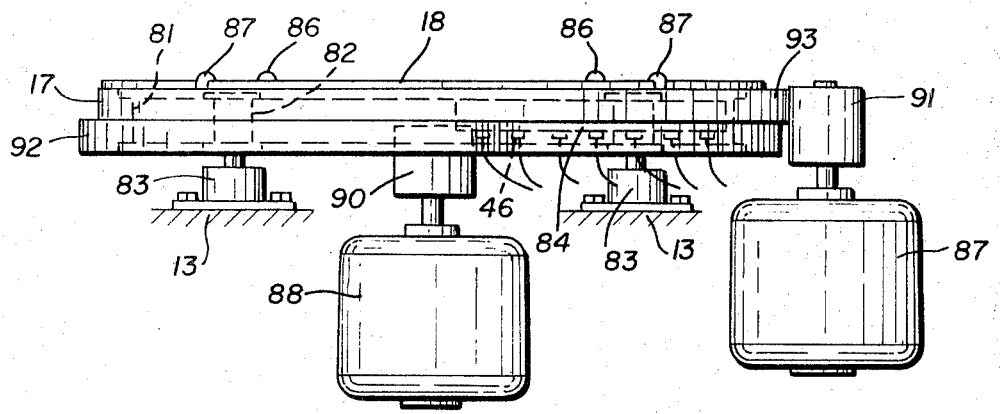
FIG. 4 is a side partial elevation further depicting said mounting and drive mechanism.

The rotary control table 17 of FIG. 1 is shown in further detail in FIGS. 3 and 4. Essentially, the rotary control table 17 is of hollow ring shape so that no cross supports or spokes are required. Necessarily, the use of such spokes would interrupt light signals transmitted by the light sources 21-27 as the spokes would pass between such light sources and the pickup photocells 41-47. The ring structure for this preferred embodiment of the table 17 has an inner track 81 for mating engagement with cooperatively formed idlers 82. The idlers 82 are rotatably supported or anchored to the cabinet 13. The assembly can include a bearing structure 83 providing rotary support for the spindle idlers 82. Through use of these idlers and the track 81, the ring formed table 17 will be constrained to move in rotary or circular pattern past mounting 84 for the photoelectric cells 41-47 and beneath the bar 19 which supports the light sources 21-27. Locator pins 86 and 87 are disposed on an upper face of the ring 17 in variably spaced positions. When a control disk 18 is to be applied to the turntable 17, the notches 96 and 97 cut in the edge of the disk 18 are engaged, respectively, to the pins 86 and 87. With this arrangement proper orientation of a control disk 18 that is placed right side up on the turntable will be assured.

Proper orientation of the disk is required, since separate turntable drive motors are provided in association with the inspiration and expiration portions of a breathing cycle. Variable speed drive motors are used for both the inspiration drive and the expiration drive. The motor for the inspiration operations is numbered 88, while the motor for expiration is identified by the number 89. The motor 88 has a drive spindle 90, and the expiration control motor has a drive spindle 91. Separate raised cam surfaces are provided on the exterior face of the turntable 17. The cam surface 92, which is related to inspiration sounds, is positioned for registration with the drive spindle 90, while the raised cam 93 adjacent the top limits of the turntable 17 is disposed at a position for engagement by the drive spindle 91.

Due to changes in elevations for the spindles, drive spindles and the cam and further due to the use of a lesser overall drive diameter for the cam 92, the drive spindle 91 will not contact the inspiration cam 92. Similarly, the inspiration related drive spindle 90 will not contact the expiration related cam 93. Each of the cams, inclusive of its transition ramp surfaces, has an arc of driven contact slightly greater than 180° thereby insuring continued drive contact with one spindle or the other. The cams are each offset 90° one from the other, but the offset angle of 90° corresponds to the offset positions for the drive spindles 90 and 91, and, accordingly, movement of the turntable will be powered essentially by one of the spindles at a time. The provision of introductory and final ramps for each of the cam surfaces avoids dead spots in drive continuity.

With the described mechanism and combination and with the use of variable speed motors, the overall cyclic rate for disseminated chest sounds, inclusive of inspiration and expiration intervals, can be changed through a wide range of from 5 to 60 breathing cycles per minute. At the same time the proportionate time interval allotted for inspirational breathing or sounds can be changed with respect to the time interval allotted for expirational sounds. A relatively prolonged period for inhalation can be combined with a shortened or explosive exhalation, or vice versa.

FIG. 6 illustrates a further improvement in which the speeds for the two separate drive motors 88 and 89 can be changed on a coordinated basis. In FIG. 6 rheostat controls are shown for the spindle drive motors 88 and 89. A wiper control gear 94 for the rheostat 96 is meshed with a wiper control gear 95 for the rheostat 97. If duration control knob 76 is directly connected to the wiper for rheostat 97, movement of this wiper to increase the speed of the motor 89 will cause an opposite movement of the gear 94 and of the wiper for rheostat 96. Accordingly, the motor 88 will be slowed. This control adjustment will, of course, speed up the expiration period, while the inspiration period is correspondingly decreased. If the rate control knob 74 is coupled through use of drive gears 98 to worm drives 102 and 103 engaging worm wheels 104 and 105 on the rheostat bodies, such bodies and the resistor windings for the rheostats 96 and 97, respectively, can be moved with respect to the associated wipers to change the rate or speed of the motors 88 and 89 on a coordinated basis. The cyclic rate for the simulated chest sounds can in this manner be changed over the full range of 5 to 60 cycles per minute as desired. Once any particular cyclic rate has been established through manipulation of the control knob 74, the duration control knob 76 can still be adjusted to proportionately change the time intervals allotted to inspiration and expiration functions.

I claim

1. Apparatus useful in connection with the teaching of diagnostic procedures related to patient respiratory sounds comprising a source of separate continuously repetitive sound related signals, signal gating means for controlling the release of said separate sound signals on a cyclic basis to simulate patient breathing functions inclusive of separately identifiable inspiration and expiration time intervals within each cycle, and means for changing the proportionate time distribution within each cycle for said separate inspiration and expiration time intervals.

2. The apparatus as set forth in claim 1 wherein at least two separate sound signals are provided in separate output channels and wherein said signal gating means provides separate control components for the interrupted release of sound signals for each of said channels.

3. The apparatus as set forth in claim 2 wherein said signal source comprises a multi-channel presentation of separate sound related signals with each sound signal being presented on a separate channel and wherein said signal gating means provides separate control components for the interrupted release of sound signals for each of said channels.

4. The apparatus as set forth in claim 3 and further comprising selector elements intermediate said multi-channel sound source and the control components of said signal gating means whereby the sound signals of a plurality of channels can be selectively introduced to one of said control components.

5. The apparatus as set forth in claim 2 and further comprising means for changing the cyclic rate of said signal gating means.

6. The apparatus as set forth in claim 5 and further comprising a rotary drive for said signal gating means with the control components of said signal gating means circumferentially disposed in a patterned arrangement separating said inspiration and expiration related control components.

7. The apparatus as set forth in claim 6 wherein a rotary table is provided for said gating means and further comprising a control disk on said table.

8. The apparatus as set forth in claim 7 wherein said control disk provides light transmissive areas and further comprising photoelectric means operative with said light transmissive areas to provide the said signal gating control components.

9. Apparatus as set forth in claim 7 and further comprising motor drive means for said signal gating means and speed control apparatus for changing the cyclic rate of said motor drive means and, accordingly, of said signal gating means.

10. The apparatus as set forth in claim 9 wherein a plurality of drive motors are provided for the rotation of said rotary table with a first motor being related to inspiration time intervals and the second motor being related to expiration time intervals.

11. The apparatus as set forth in claim 10 and further comprising separate and alternate contact components for said separate drive motors whereby the rotational speed of said rotary table is at any time dependent only upon power derived from either the inspiration or expiration drive motors.

12. The apparatus as set forth in claim 11 wherein the separate contact components are cam surfaces provided on said rotary table.

13. The apparatus as set forth in claim 12 wherein said cam surfaces are cooperatively positioned with respect to the positioning of said drive motors whereby the power utilized to rotate said table is alternately applied by one cam surface or the other.

14. The apparatus as set forth in claim 10 wherein separate speed control apparatus is provided for each of said drive motors and further comprising means interconnecting said speed control apparatus whereby the speed of the separate motors is alternately and selectively adjustable to provide conjoint or complimentary changes for the output drive speeds of said separate motors.

15. The apparatus as set forth in claim 14 wherein the said separate speed control apparatus for the separate drive motors are inclusive of separate rheostat components.

16. The apparatus as set forth in claim 8 wherein said control components are disposed circumferentially in positions of registration with said photoelectric means.

17. The apparatus as set forth in claim 2 wherein the source of said sound related signals is a multi-channel tape and player system.

18. The apparatus as set forth in claim 17 wherein at least one channel of said tape player system provides audio instruction materials related to the respiratory sounds being disseminated by said apparatus.

19. The apparatus as set forth in claim 17 wherein at least one channel of said tape player system provides a signal adapted for visual display and further comprising visual display apparatus for the reception and display thereof.

* * * * *